United States Patent Office 3,084,161
Patented Apr. 2, 1963

3,084,161
NEW 3-METHYLSULPHINYL PHENOTHIAZINE DERIVATIVES
Jany Renz and Jean-Pierre Bourquin, Basel, and Gustav Schwarb, Neuallschwil, Basel-Land, Switzerland, assignors to Sandoz Ltd., Basel, Switzerland
No Drawing. Filed Feb. 27, 1961, Ser. No. 91,615
Claims priority, application Switzerland Mar. 10, 1960
3 Claims. (Cl. 260—243)

The present invention relates to new phenothiazine derivatives, their acid addition salts and a process for their production.

The new phenothiazine derivatives of the present invention correspond to the Formula I,

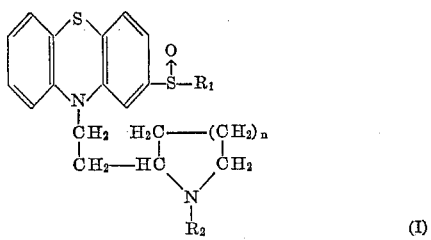

wherein each of $R_1$ and $R_2$ represents a member selected from the group consisting of alkyl radicals containing from 1 to 4 carbon atoms and $n$ is an integer from 1 to 2.

The aforesaid phenothiazine derivatives of the Formula I are prepared, according to this invention, by condensing a compound of the Formula II,

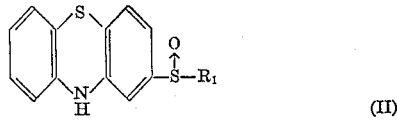

with a halogeno compound of the Formula III,

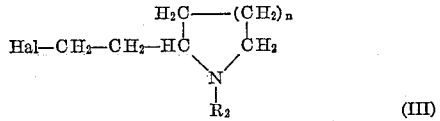

wherein $R_1$ has the above significance, with a halogeno compound of the Formula III, wherein $R_2$ and $n$ have the above significance and Hal is a member selected from the group consisting of chlorine, bromine and iodine.

When it is desired to produce an acid addition salt of a compound having the Formula I above, salification is effected with an organic or inorganic acid, for example hydrochloric, hydrobromic, sulphuric, citric, oxalic, tartaric, succinic, maleic, acetic, benzoic, hexahydrobenzoic, methanesulphonic and fumaric.

One method of carrying out the process of the invention, for example, consists in reacting a compound II above dissolved in an inert organic solvent, for example benzene, toluene, or xylene, with a halogeno compound III at or above room temperature in the presence of an alkaline condensation agent, for example an alkali metal or an alkali metal compound (e.g. hydroxides, amides or alkanolates); specific such alkaline condensation agents are metallic sodium, sodium or potassium hydroxide, sodium amide and sodium tertiary butylate.

After the reaction has gone to completion, the isolation of the required compound I may be effected by extracting the reaction mixture with water and evaporating the solvent at a reduced pressure; however, the compound I may likewise be extracted from the reaction mixture with a dilute mineral or organic acid and then precipitated from the aqueous phase by adding an alkali hydroxide or ammonia. When present in solid form the bases may be filtered off, or, when present in an oily form, extracted with benzene or another water-immiscible inert organic solvent, followed by removal of the solvent through evaporation. The bases may be purified by distillation in a high vacuum.

The compounds I above are oily or crystalline and generally form salts which are stable at room temperature. They possess therapeutically valuable pharmacodynamic properties, such for example as the potentiating of the effect of narcotically, hypnotically, or analgetically acting pharmaceuticals, and are therefore useful as prenarcosis preparatives. They are also useful in the treatment of allergies and as spasmolytica or neuroplegica.

The compounds II above may be produced by acetylating a compound of the general Formula IV,

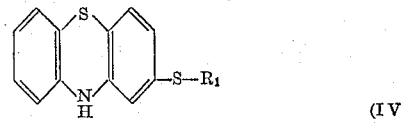

wherein $R_1$ has the above significance, and the resulting acetylated compound is oxidised with an equimolar amount of hydrogen peroxide, the acetyl group being split off thereafter.

For illustration of the variation of the $R_1$ group in Formula II and the $R_2$ group in Formula III the following examples are given wherein each of $R_1$ and $R_2$ is methyl. But it is clear that $R_1$ in Formula II as well as $R_2$ in Formula III may also be ethyl, propyl, isopropyl and butyl.

In the following examples, which are intended to illustrate the invention without limiting it, all temperatures are stated in degrees centigrade and the melting points are corrected.

EXAMPLE 1

3-Methylsulphinyl-10-[2'-(N-Methyl-Piperidyl-2'')-Ethyl-1']-Phenothiazine (a) 3-methylsulphinyl-phenothiazine.—10.0 g. of 3-methylmercapto phenothiazine and 17.5 cc. of acetic acid anhydride are refluxed for 8 hours from an oil bath maintained at a temperature of 180°. After concentration of the solution the residue is crystallised from ethanol. The pure 3-methylmercapto-10-acetyl phenothiazine melts at 89–91°. For the purpose of oxidation 5.0 g. of 3-methylmercapto-10-acetyl phenothiazine are dissolved in 50 cc. of ethanol, refluxed from an oil bath maintained at 120°, and 1.6 cc. of a 40% hydrogen peroxide solution are then added dropwise in the course of 30 minutes. Heating is continued for another 5 hours and the reaction mixture is concentrated after 50 cc. of water have been added. The residue is taken up in 40 cc. of benzene and the benzene layer washed with 10 cc. of water. After having been concentrated, the residue, crude 3-methylsulphinyl-10-acetyl phenothiazine, is dissolved in 55 cc. of a 90% methanol solution for splitting off the acetyl group and, after 2.9 g. of potassium carbonate have been added, it is boiled for 2 hours under reflux on an oil bath kept at a temperature of 120°. After concentration, the residue is taken up in 50 cc. of chloroform, the chloroform layer is washed with a total of 25 cc. of water, dried over potassium carbonate, filtered and concentrated. After twice crystallising the residue, each time from 50 cc. of ethanol, analytically pure 3-methylsulphinyl phenothiazine (M.P. 193–195°) is obtained.

(b) 3-Methylsulphinyl-10-[2'-(N-Methyl-Piperidyl-2'')-Ethyl-1']-Phenothiazine

A mixture of 10.0 g. of 3-methylsulphinyl phenothiazine (M.P. 193–195°), 6.1 g. of finely powdered sodium hydroxide and 125 cc. of toluene is boiled for 1 hour under reflux with a water separator on an oil bath kept at a temperature of 150°, whilst the mixture is stirred. Without interrupting the boil a solution of 7.0 g. of 2-(N-methyl-piperidyl-2')-1-chloroethane (B.P. 84°/10 mm. Hg) in 10 cc. of toluene is added dropwise in the course of 1 hour, after which boiling is continued for another 3 hours. When the reaction mixture has cooled it is first washed with 25 cc. of water three times and then extracted with 75 cc. of a 15% aqueous tartaric acid solution. The tartaric acid extract is shaken out with 25 cc. of benzene, 20 cc. of concentrated caustic soda are added until the phenolphthalein reaction is alkaline, and the separated oily base is taken up in a total of 150 cc. of benzene. After having been washed with 50 cc. of water the benzene layer is dried over potassium carbonate, filtered, allowed to stand over 10 g. of alumina for about 1½ hours for partial decolourisation, filtered again and concentrated under reduced pressure. The oily base which remains as a residue is directly converted into the tartrate. A solution cooled to 0°, of 6.50 g. of the free base in 100 cc. of acetic acid ethyl ester is thoroughly shaken and poured into an ice cold solution of 2.66 g. of tartaric acid in 410 cc. of acetic acid ethyl ester. The precipitated, analytically pure, tartrate of 3-methylsulphinyl-10-[2'-N-methyl-piperidyl - 2")- ethyl-1']-phenothiazine melts at 115–120° (foam formation) and sinters above 80°.

EXAMPLE 2

*3-Methylsulphinyl-10-[2-(N-Methyl-Pyrrolidyl-2")-Ethyl-1']-Phenothiazine*

A mixture of 10.0 g. of 3-methylsulphinyl phenothiazine (M.P. 193–195°), 6.1 g. of finely pulverised sodium hydroxide and 125 cc. of toluene is boiled with a water separator under reflux for one hour on an oil bath maintained at a temperature of 150°, whilst the mixture is being stirred. Without interrupting the boil a solution in 10 cc. of toluene of 6.35 g. of 2-(N-methyl-pyrrolidyl-2')-1-chloroethane (B.P. 65°/13 mm. Hg) is added dropwise in the course of 1 hour and heating is continued for another 3 hours. After having cooled, the reaction mixture is washed with 25 cc. of water three times and then extracted with 75 cc. of a 15% aqueous tartaric acid solution. The tartaric acid extract is shaken out with 25 cc. of benzene, 20 cc. of concentrated caustic soda solution are added until the phenolphthalein reaction is alkaline, and the separated oily base is taken up in a total of 150 cc. of benzene. After having been washed with 50 cc. of water the benzene layer is dried over potassium carbonate, filtered and concentrated under reduced pressure. For purification, 14 g. of the crude base are chromatographed on a column of 420 g. of alumina. The base is dissolved in 65 cc. of benzene and then put through the column. After the column has been washed with 500 cc. of benzene and then with 750 cc. of benzene/methanol (0.5 vol. percent methanol), the substance is eluted with altogether 750 cc. of benzene/methanol (1 vol. percent methanol). The eluate is evaporated under reduced pressure and the oily base remaining as a residue is directly converted into the tartrate. A solution of 10.66 g. of the free base in 150 cc. of acetic acid ethyl ester cooled to 0° and well shaken is added to an ice cold solution of 4.27 g. of tartaric acid in 900 cc. of acetic acid ethyl ester. The precipitated, analytically pure, tartrate of 3-methyl-sulphinyl - 10-[2'-(N-methylpyrrolidyl-2")-ethyl-1']-phenothiazine melts at 105–108° (foaming) and sinters above 85°.

Having thus disclosed the invention, what is claimed is:

1. A member of the class consisting of a phenothiazine derivative of the Formula I,

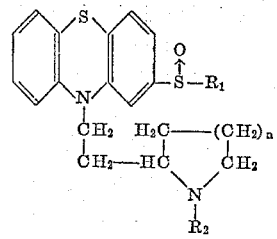

wherein each of $R_1$ and $R_2$ represents a member selected from the group consisting of alkyl radicals containing from 1 to 4 carbon atoms and $n$ is an integer from 1 to 2 and therapeutically useful acid addition salts of said phenothiazine with an acid selected from the group consisting of hydrochloric, hydrobromic, sulphuric, citric, oxalic, tartaric, succinic, maleic, acetic, benzoic, hexahydrobenzoic, methanesulphonic and fumaric acids 2. 3 - methylsulphinyl-10-[2'-(N-methyl-piperidyl-2")-ethyl-1']-phenothiazine.

3. 3 - methylsulphinyl - 10 - [2' - (N-methyl-pyrrolidyl-2")-ethyl-1']-phenothiazine.

References Cited in the file of this patent

UNITED STATES PATENTS

| | | |
|---|---|---|
| 2,272,498 | Zerweck et al. | Feb. 10, 1942 |
| 2,927,926 | Zima et al. | Mar. 8, 1960 |
| 2,979,502 | Gailliot et al. | Apr. 11, 1961 |

FOREIGN PATENTS

| | | |
|---|---|---|
| 198,273 | Austria | June 25, 1958 |

OTHER REFERENCES

Richter: Organic Chemistry, vol. 1, page 174, Elsevier Publishing Co., Inc., third edition, American Photo Offset Reprint (1944).